United States Patent [19]
Yerazunis et al.

[11] Patent Number: 5,793,382
[45] Date of Patent: Aug. 11, 1998

[54] METHOD FOR SMOOTH MOTION IN A DISTRIBUTED VIRTUAL REALITY ENVIRONMENT

[75] Inventors: William Stephen Yerazunis, Belmont; Richard C. Waters, Concord, both of Mass.

[73] Assignee: Mitsubishi Electric Information Technology Center America, Inc., Cambridge, Mass.

[21] Appl. No.: 659,714

[22] Filed: Jun. 10, 1996

[51] Int. Cl.$^6$ .................................................. G06F 15/00
[52] U.S. Cl. ............................................................. 345/474
[58] Field of Search ................................. 345/473, 474, 345/475

[56] References Cited

U.S. PATENT DOCUMENTS 5,416,899   5/1995   Poggio et al. ........................... 395/152
5,724,074   3/1998   Chainam et al. ........................ 345/474

Primary Examiner—Phu K. Nguyen
Attorney, Agent, or Firm—Robert K. Tendler

[57]  ABSTRACT

A system assures smooth motion in a distributed virtual reality environment by categorizing the information to be transmitted as to the predictability of future motion and applying appropriate smoothing algorithms based upon knowledge of what the future motion is likely to be. The system switches between a linear interpolation algorithm for less predictable data and a Catmull-Rom spline for more predictable data.

15 Claims, 10 Drawing Sheets

METHOD FOR SMOOTH MOTION IN A DISTRIBUTED VIRTUAL REALITY ENVIRONMENT

FIELD OF INVENTION

This invention relates to distributed virtual environments and more particularly to achieving smooth motion in a shared distributed virtual reality system.

BACKGROUND OF THE INVENTION

In multi-user virtual reality environments, when graphical objects are moved along a path, indicating motion of the object, it is oftentimes difficult to make this motion smooth in the face of lost packets of data, delayed packets, or when network bandwidth is insufficient to transmit real-time frame-to-frame data reflecting the motion required.

For instance, when a virtual reality application seeks to portray a moving car, the motion of the car will be smooth assuming that the position data necessary to simulate the motion is uninterrupted. If the data stream is interrupted or delayed for any of a variety of reasons, the onscreen motion will be jittery or halting while the system waits for data to continue the animation.

In the case of single-user systems, because there is no communications overhead or chance of lost network messages, smoothness of object motion is limited only by how fast the hardware can render the geometric description of the scene into the video memory of the display device. However for networked data transfer, image jitter often occurs when the network is interrupted or overloaded. Moreover, data may be lost when the network is overloaded resulting in discarded packets. The result is that on-screen motion is jerky due to lost data.

In a multi-user system with a central server, a problem arises in that the central server is a bounded resource and will become overloaded at some relatively small number of participants. For example, Silicon Graphics Inc.'s Shared Virtual Reality system work well for four or fewer participants, but becomes slow at five and prohibitively degraded at over six simultaneous users.

The shared virtual reality systems known as "Worlds Chat" and "Electronic Campus" also uses this central-server architecture. The central server computes accurate positions for every object in the world and transmits positioning coordinates to each viewing station. This makes the viewing station computational load lighter since the motion computation is computed centrally, only once, however because there is a single central server, overload is guaranteed to occur and the system cannot be scaled to large simulated environments.

Other systems without central servers have been created; most of them are based on the US. Department of Defense's SIMNET architecture. The US Department of Defense's distributed interactive simulation system, or DIS, is based on SIMNET and achieves scaleability but at the loss of smooth and pleasant object motion. Virtual vehicles moving around in the DIS virtual world are updated at regular intervals, every five seconds in the typical DIS case, by broadcasting of messages from each simulation host node. The DIS update packet, called a Program Data Unit or PDU, contains a position, a time and a linear velocity vector for each vehicle in a simulation. This PDU is transmitted to the rendering stations. This simple linear calculation is insufficient over more than a few seconds, so the simulation station owning each particular vehicle uses a much more detailed and computationally-intensive simulation of the vehicle dynamics to give a much more accurate position and velocity.

Because only the linear-velocity PDU is transmitted and transmission occurs only every five seconds, the position and velocity of a rendered DIS object vehicle may rapidly diverge from the accurate position and velocity computed by on the controlling node's high-accuracy simulation. In order to prevent this dead-reckoning error from accumulating, DIS simulations rebroadcast new PDUs with updated position and velocity every five seconds for each vehicle in the simulation. Upon receipt of the new PDU, the rendered positions of DIS vehicles will jump to the new locations, which may be many meters away from the dead-reckoned position.

For example, a tank near the crest of a hill may be climbing at a 30-degree angle, at five meters/second velocity. If a PDU is sent just before the tank crosses the top of the hill, then by the time the next PDU is sent, the rendered tank displayed on other user workstations will be approximately 40 feet in the air and still gaining altitude.

In addition, all of the above systems operate over networks such that packet loss can be prevented, either by an automatic retransmit mechanism, or by having adequate network bandwidth to prevent packet loss or delay. Unfortunately, the Internet is not usually such a friendly environment. Bandwidth is limited, and packets are often delayed, duplicated, or simply lost. Therefore both robustness of transmission and minimization of bandwidth are important.

Another important issue is the data provider type. Some systems, such as video games, assume that the typical moving object will move on a fixed path with this path being known a priori. Knowledge of the path therefore implies complete knowledge of the position of the object for all future time. Other objects are controlled by so-called intelligent agents. These agents determine their future action based upon the environment. Once a choice is made, the future motions are known for a few seconds into the future. Lastly, there are so-called real-time agents. These agents depend on real-time inputs from systems that are inherently unpredictable. A prime example is input from a human user. In such cases, it is not possible to do more than guess a likely future position. Any successful smooth motion system must be able to cope with this varying amount of "lead time".

Another important issue is the infinite velocity formulation. In many applications, it is necessary to move a created object around at infinite velocity. This typically happens when an object is first created. Normally it appears initially at the origin and then must be moved to it's desired position. Any system that uses velocity as a required state variable may experience overflow and fail.

Because the frame-rendering rate of the receiving station may not match the data transmission rate of the sending station, a visually plausible system must be able to render the position of objects "in between" transmitted locations. If this is not done, visual heterodyning may occur (this is the same effect that causes wagon wheels to appear to rotate backwards in old movies).

Finally, the per-object computation must be very easy to perform, because each rendering station will have to perform the computation for each of hundreds or perhaps thousands of objects, for each display frame, in real time. This implies that numerical integration or other iterative functions are not appropriate for smooth object motion.

SUMMARY OF THE INVENTION

The above problems of providing smooth motion in a distributed virtual reality environment are solved by automatically categorizing the information to be transmitted as to the predictability of future motion and applying appropriate smoothing algorithms based upon knowledge of what the characteristics of the future motion are likely to be. In one embodiment the system switches between a linear extrapolation algorithm for hypothesized future locations, linear interpolation for short-term predictable locations, and a Catmull-Rom spline for long term predictable locations.

For instance, a virtual reality environment may have a trolley-car moving within the environment on a fixed course (the trolley track). The path between stops for the trolley is completely determined; the only variable is the starting time. Once the trolley starts to move, it's future position can be exactly predicted as a function of time for the duration of the next track segment. Because motion is known for a long time into the future, the path can be a long, smooth motion. One might even consider the predetermined path to be a "script" for the trolley-car's motions.

A less predictable example is a video game "robot fighter", such as is found in common video games. The fighter has a small repertory of fixed motion action stubs, each one perhaps a second or two long. These action stubs might be such actions as "throw punch", "duck head", "kick", "jump high" or "flip over". The overall long-term action of the fighter is not predictable, but once an action such as "throw punch" is begun, the motion is predictable for the duration of the action. Again, it is desired that the motions be as smooth as possible, even though there is no long-term "script" to the fighter's motions.

A non-predictable motion source is a human user supplying command motion inputs, via a joystick or mouse which controls the movement of an on-screen 'electronic puppet', or avatar. In this case, there is no "predictability" to the motion, but it is still desirable that the motion of the on-screen avatar be visually smooth and pleasant.

The invention achieves smooth motion in all three cases by providing a callable interface that can accept as little or as much future position information as available. Based on how much future position information is available, the invention automatically switches between a high-quality spline interpolation, a fast linear interpolation, or linear extrapolation to generate smooth output positions at any desired time and at any desired display frame rate.

Because the invention can dynamically switch among the motion generation and smoothing algorithms, it can operate even in circumstances where a single object is alternatively controlled by a long, predetermined "script", a series of short action stubs, and real-time user input. An example of such a system might be a simulation of a Space Shuttle satellite repair mission, where the initial segments such as the liftoff from the launch pad are entirely under control of the autopilot which is simulated by a long-term script. Then the orbital docking preparation motions are controlled by action stubs such as "open cargo bay doors" and "extend grasping arm", and the final grasping and repair of the satellite is controlled directly by real-time inputs from the user. The autopilot flight plan is long-term predictable, the orbital docking preparations are only short-term predictable, and the grasping and repair operations are real-time and unpredictable. By dynamically switching between motion generation and smoothing algorithms, the invention can provide smooth and plausible behavior throughout the simulation.

More specifically, the invention is composed of several parts which work together to provide smooth plausible motion. In the subject system smoothing algorithms are chosen dynamically to control the behavior of the software program controlling a particular on-screen object. To accomplish this, each desired location along the motion path is encoded as a position in XYZ space, with a unit vector specifying an axis for the object to be rotated, and an angle specifying how far to rotate the object. This information is formatted into packets sent on a standard network such as the Internet. Each packet contains redundant information so that if there is packet loss or corruption, the receiving station can still generate plausible motion. In rendering, a set of compatible interpolation functions are used so that the object motion remains plausible even as the data supplier shifts between long-term pre-designated motion, short-term pre-designated motion, and real-time motion control.

Further smoothing is achieved for dropped packets by providing redundant data in individual packets. Even if one packet is lost, adjacent packets contain enough information that smooth, plausible motion is still achieved.

Other smoothing is achieved by using extrapolation in position, axis of rotation, and angle of rotation to achieve smooth and plausible motion even in the event of large amounts of missing data.

Still further smoothing is achieved by using angle and axis unwrapping to prevent the anomalous behavior sometimes seen where an object rotates almost a complete circle in the incorrect direction because of a nonlinear rotation boundary. For example, if the input system always yields an angle between 0 and 360 degrees, and an object was already rotated to 359 degrees, then a command of "move to rotation +1 degree" can be interpreted two different ways. One way is to rotate back 358 degrees (the "long way"). The other and more reasonable interpretation is to rotate just two degrees further. The effect of angle and axis unwrapping is to prevent such anomalous behavior.

There are three smoothing algorithms used in the current implementation of the invention. The switching is done based upon how many future location points are supplied by the application to the invention. If two or more points in the future are supplied, then the object is considered to be in long-term predictable motion. If only one future point is supplied, then the object is considered to be only short-term predictable. If no future points are supplied, then the object is considered to be under real-time control.

For long-term motion, the Catmull-Rom spline function is used for motion smoothing. This well-known spline function requires as input four known object locations; two of these locations must be in the past relative to the desired display time, and two must be in the future. The Catmull-Rom spline function can then be evaluated for any display time between the most recent 'past' time and the soonest 'future' time, and yields a smooth and pleasant motion.

For short-term motion where at most a single point in the future is known, linear interpolation is used. This is equivalent to having the object move smoothly along a line joining the most recent 'past' point to the most recent 'future' point.

For real time motion where no future points are known, linear extrapolation is used. This extrapolation makes the assumption that the object will move past the most recent known point along a straight line. This is equivalent to Newton's laws of motion- that an object in motion will remain in motion unless acted upon by an external force.

All three of these motion smoothing methods are performed both for the X, Y, Z positioning information as well as the axis and angle of rotation. By providing these methods in position, in axis of rotation, and in angle of rotation, smooth and plausible motion is achieved.

BRIEF DESCRIPTION OF THE DRAWINGS

These and other features of the Subject Invention will be better understood taken in conjunction with the Detailed Description, taken in conjunction with the Drawings, of which.

DETAILED DESCRIPTION OF THE INVENTION

Figure 1:
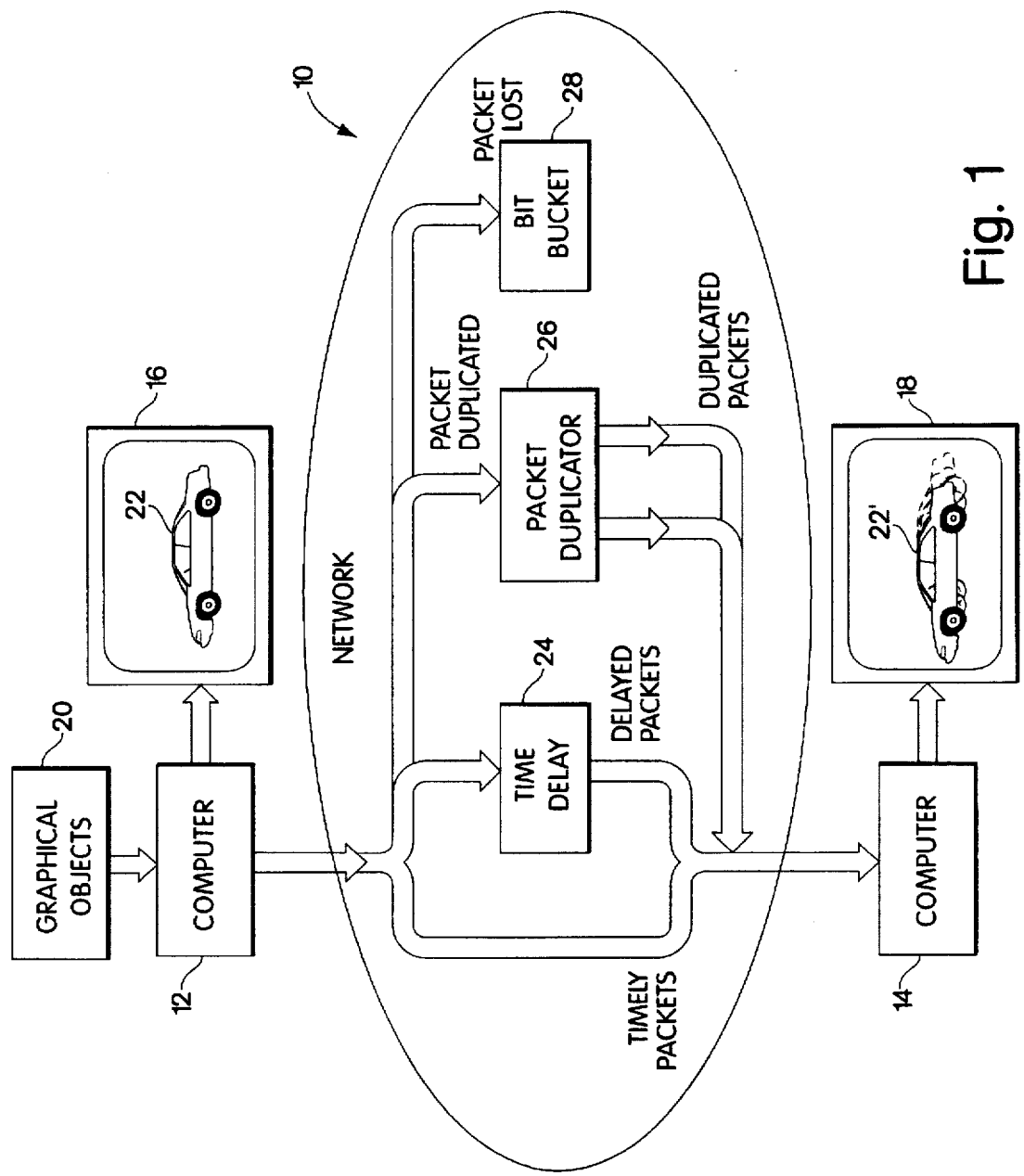
FIG. 1 is a block diagram showing the jitter associated with time-delays, packet duplication, and lost packets during the graphical rendering of an animated object.

Referring now to FIG. 1, a network 10 to which are coupled two computers 12 and 14, each with an associated monitor 16 and 18 respectively, at which graphical objects are presented. In one embodiment, graphical objects 20 are stored in the memory of computer 12, for example, an automobile 22 being the graphical object presented.

When it is desired to transmit this moving graphical object across network 10 to computer 14, graphical object 22' exhibits positional instability, sometimes called jitter, due to various network-induced artifacts. These artifacts are characterized as having been generated by time delays as illustrated at 24, resulting in delayed packets, packet duplication as illustrated at 26 in which packets are inadvertently duplicated, and lost packets generally illustrated as having been dumped into a so-called bit bucket 28.

The problem with the lost, duplicated or delayed packets is that the corresponding graphical object will have a hesitant motion, or one in which the motion is retraced. The annoyance associated with such jitter has in the past resulted in a number of techniques for averaging so as to be able to smooth out this jitter.

More specifically, initially some graphical objects 22 are created and placed into the memory of the computer 12 which functions as the transmitting workstation. These graphical objects may portray an animation, or some other set of actions that take place over the course of time. These graphical objects and their motions are converted to packets to be transmitted over the network. The network is like the Internet with most packets being delivered correctly and on time. However some small fraction of the packets are delayed, hence arriving out of order. Some other small fraction of the packets are duplicated and so two copies of such packets are delivered, with a short time delay between them. Finally, a small fraction of the packets are simply lost and never arrive at their destination. The network routes these packets to various destinations, such as the receiving station. At a receiving station, here illustrated as computer 14, the packets are converted back into graphical objects and motions for the graphical objects, and displayed.

Figure 2:
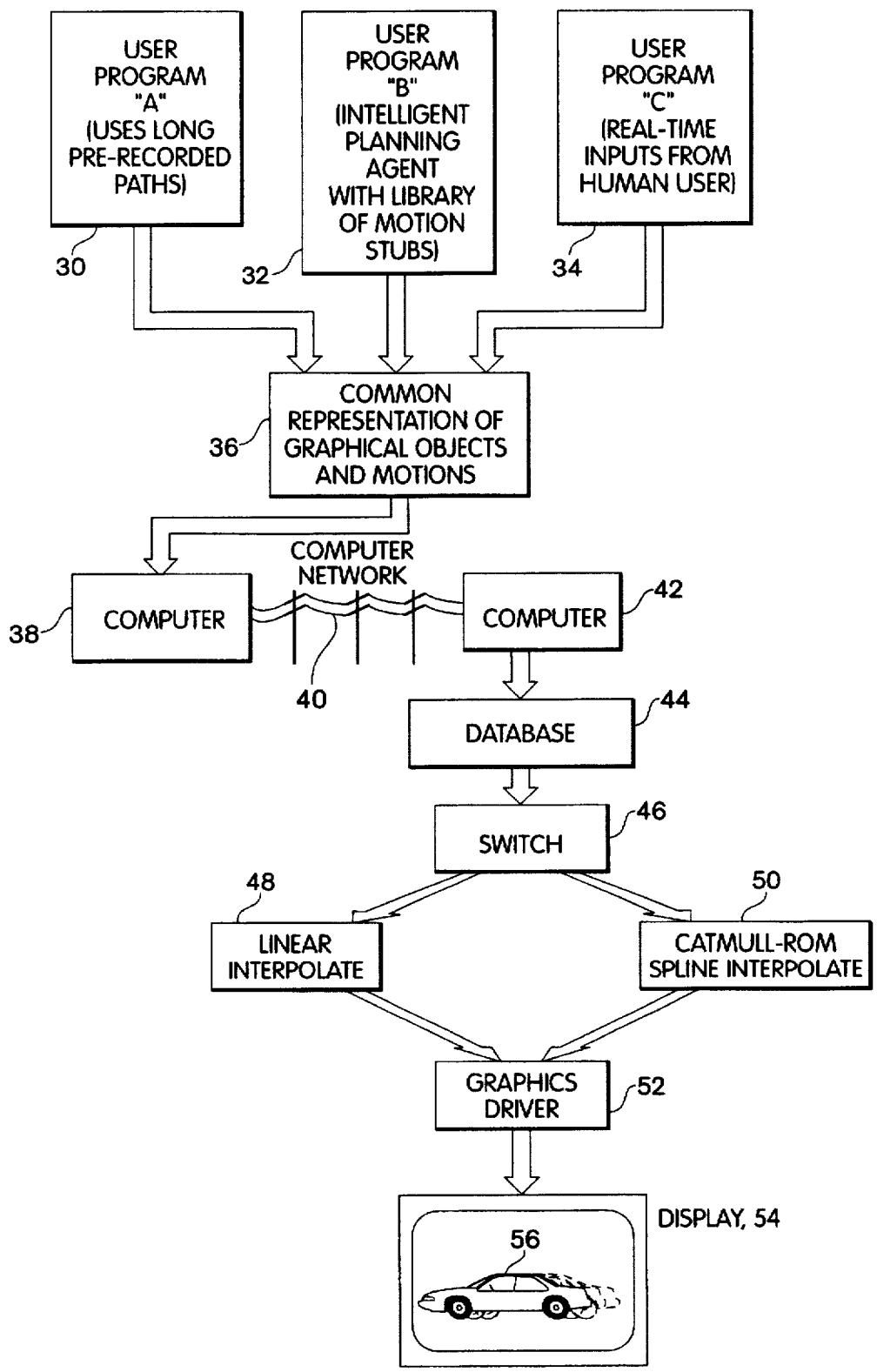
FIG. 2 is a block diagram showing a more detailed view of a multiuser virtual reality system, with alternate transmitting programs.

Referring now to FIG. 2, in order to solve the above-mentioned jitter problem, a number of user programs 30, 32, and 34 illustrate various predictability or longevity's. User program 30 uses long prerecorded paths as would be common in a cartoon-like animation. Typically the cartoon-like animation may have pre-recorded actions lasting several minutes. User program 32 is characterized by a so-called intelligent planning agent with a library of motion subroutines or stubs. User program 32 does not have as long a predictability as user program 30 due to the variability that the intelligent planning agent may impose on the output. Typically the intelligent planning agent will employ stubs on the order of a quarter-second to one full second long. An example of this program is a computer game in which various characters kick, punch, or move in accordance with a specialized subroutine or "motion stub" under the control of the intelligent planning agent and/or the person playing the game.

User program 34, on the other hand, utilizes real-time inputs from an individual, which are in general not predictable. An example of this is someone navigating a virtual reality environment.

As can be seen, a single averaging technique would fail to accommodate all three types of user programs. In the subject system, each of these user programs are converted to a common representation of graphical objects and motions as illustrated at 36, with graphical objects and motions being transmitted via a transmitting station having a computer 38, over a network 40, to a receiving station having a computer 42, which loads the graphical objects and motions into a database 44.

A switch 46 switches the output of database 44 either to a linear interpolator system 48 or a Catmull-Rom spline interpolator system 50 depending on the available amount of information in the database 44. This permits an appropriate smoothing algorithm to be applied to the graphical data from the database to minimize jitter. The output of either interpolation is provided to a graphics driver 52 in turn coupled to a display 54 such that the motion of graphical object 56 is smooth.

As will be discussed hereinafter in FIG. 6, further jitter due to duplicate packet generation is removed through the detection of the duplicate packets, with the second of the duplicate packets being discarded.

Figure 3:
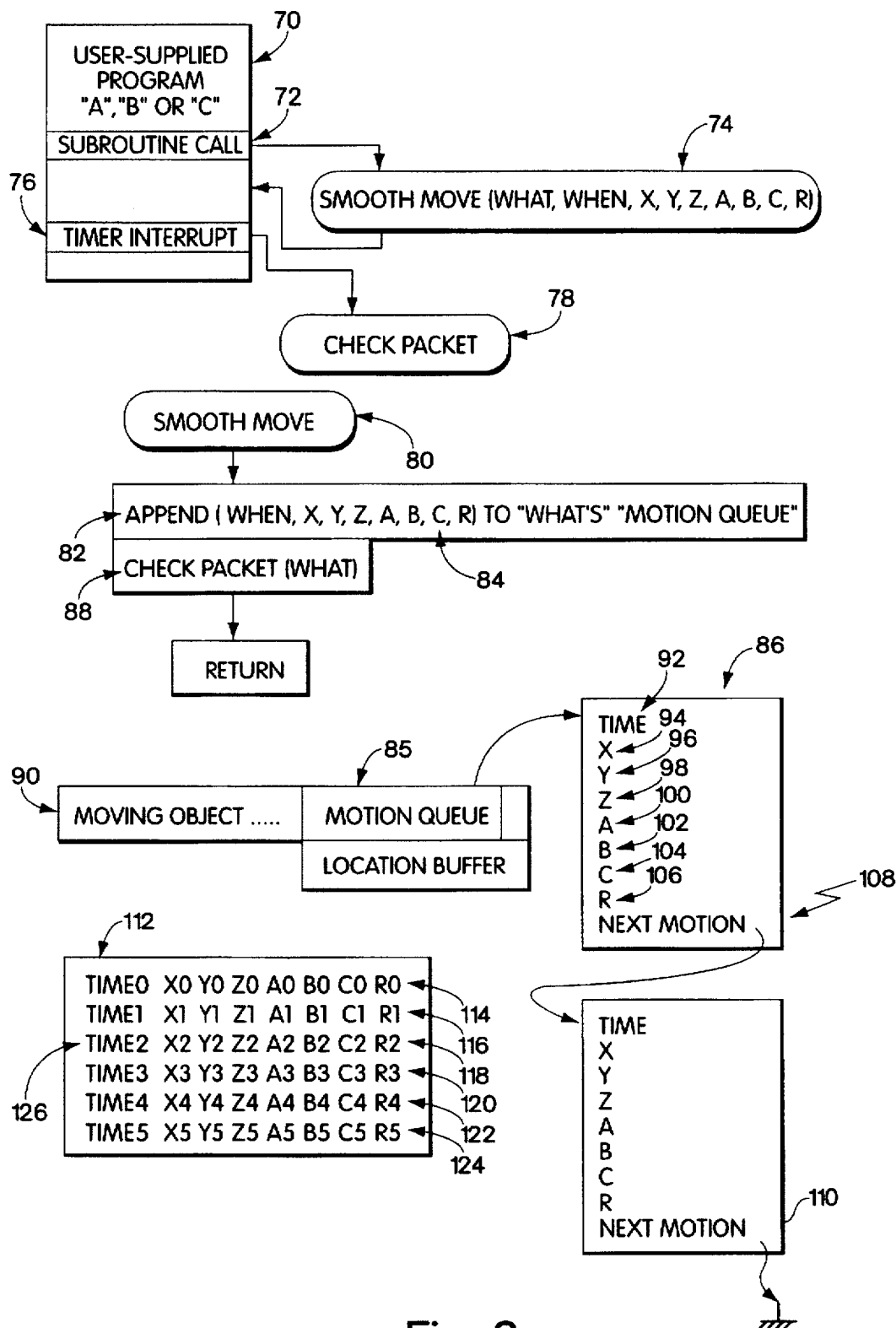
FIG. 3 is a flow chart and data structure diagram showing typical software and data structures in a transmitting station.

Referring now to FIG. 3, a user supplied program 70 contains embedded subroutine calls 72 to the SmoothMove subroutine entry point 74. The user supplied program 70 also contains a call to the timer interrupt scheduler 76, which regularly calls the CheckPacket entry point 78.

The SmoothMove entry point 74 is called with 9 arguments—one argument specifying a time, seven arguments explained hereinafter representing position, and one argument specifying a graphical object. The action of SmoothMove is to cause the graphical object to move to the location and orientation specified at exactly the time specified. In one embodiment of the invention, the nine arguments to SmoothMove are accepted exactly as supplied by the user-supplied program 70. In another embodiment of the invention, angle and axis unwrapping as described in the Summary above is performed on the arguments 84 to remove anomalous behavior such as moving from +179 degrees of rotation to +179 degrees of rotation by going nearly a full circle clockwise when moving just two degrees counterclockwise would also suffice. This optional angle and axis unwrapping step is needed only if the user supplied program 70 calls SmoothMove 74 with rotation specification commands containing such artifacts. After this optional angle and axis unwrapping operation, execution proceeds to step 82

In step 82 allocates a block of memory, copies the desired time and location information 84 into the allocated block, and appends it to the object motion queue 86, pointed to by motion queue pointer 85. The second step 88 of subroutine SmoothMove calls the entry point of subroutine CheckPacket, discussed hereinafter in FIG. 4.

The implementation of the object motion queue 86 is a simple linked list. A graphical object 90 contains a pointer 85 to the first element in the object motion queue. Each object motion queue block contains slots for TIME 92, X 94, Y 96, Z 98, A 100, B 102, C 104, R 106, and a pointer to the next object motion queue block 108. The final block in the object motion queue indicates it as last by having the value 0 as the pointer to next block 110.

More specifically, the desired time and linear translation coordinates are stored in TIME 92, X 94, Y 96, and Z 98. Then the rotation coordinates are stored as a set of three numbers denoting a vector which is considered to be an axis of rotation, plus a fourth additional number denoting how great an angle of rotation is desired. This is analogous to the common notion of a unit vector and a rotation angle. In the case of the Subject Invention, the unit vector indicating the axis of rotation is denoted by the coordinates A 100, B 102, and C 104. A is the component of the rotation axis vector as measured along the X axis, B is the component of the rotation axis vector along the Y axis, and C is the component of the rotation axis vector as measured along the Z axis. Lastly, R 106 is the amount of rotation desired.

These data tuples of TIME, X, Y, Z, A, B, C, and R are referred to hereafter as PAR data structures, with PAR being the acronym for Position, Axis, and Rotation.

Each moving object 90 carries a location PAR buffer 112. This location PAR buffer contains six PAR data structures. These data structures will be referred to as PAR0 114, PAR1 116, PAR2 118, PAR3 120, PAR4 122, and PAR5 124. The time specified in PAR0 will be referred to as TIME0, the time specified in PAR1 will be referred to as TIME1, and so forth up to TIME5. The X position specified in PAR0 will be referred to as X0, the X position specified in PAR1 will be referred to as X1, and so forth up to X5. Similarly defined are Y0, Y1, Y2, etc. on through R0, R1, R2, R3, R4, and R5. In particular, TIME2 126, the TIME2 data of PAR2 118, will be referenced hereinunder in FIG. 4.

Figure 4:
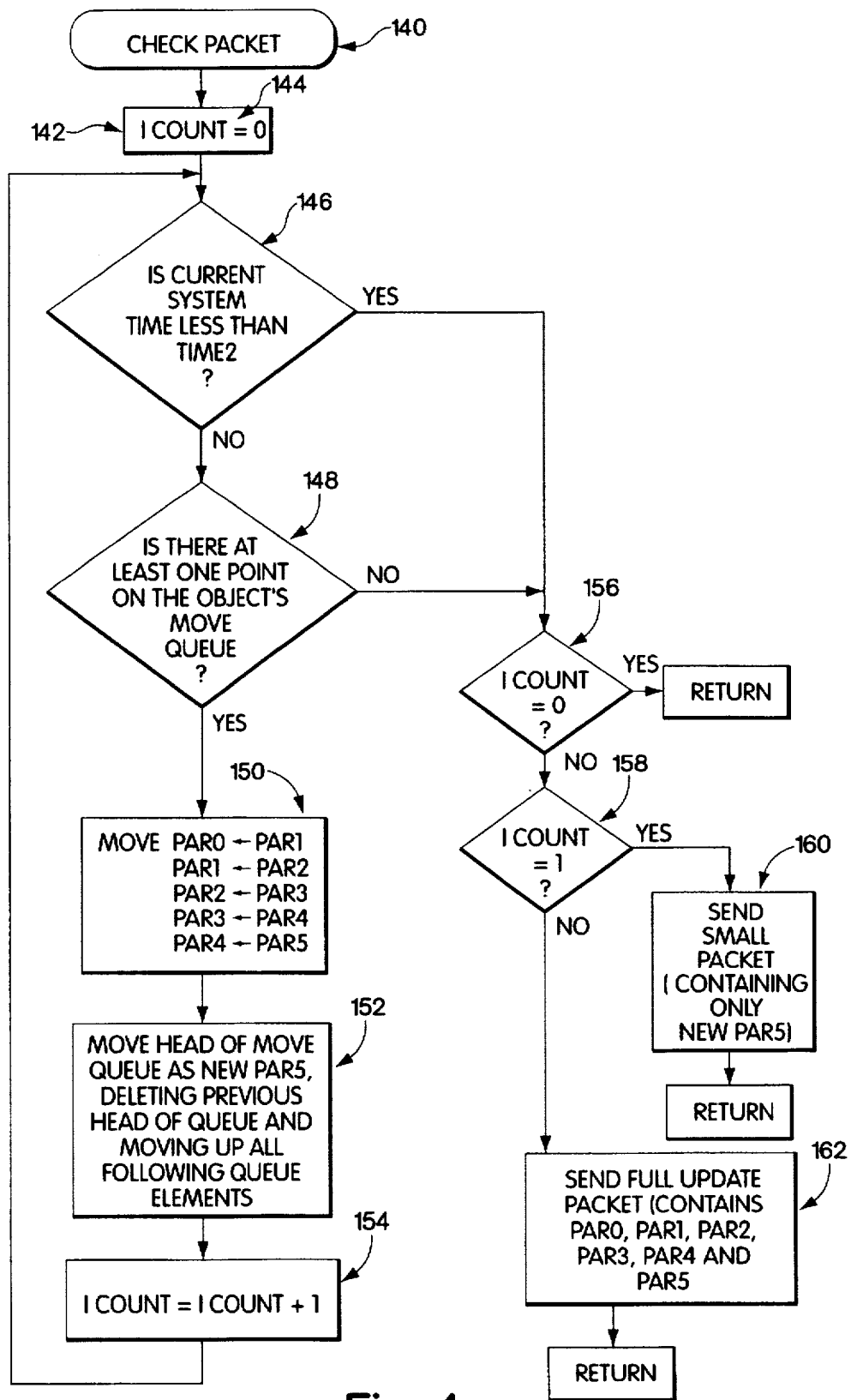
FIG. 4 is a flowchart of a particular subroutine used in the transmitting station of FIG. 1.

Referring now to FIG. 4, a detailed description of the CheckPacket subroutine is shown. The CheckPacket entry point transfers control to the CheckPacket subroutine start at step 140. In the next step 142, a counter ICOUNT 144 is initialized to 0. Execution proceeds immediately to step 146.

In step 146, the current system time is compared with the graphical object's TIME2 126. If the current system time is earlier in time than TIME2, then execution jumps to step 156. Otherwise, execution proceeds to step 148.

In step 148, the motion queue 86 of the graphical object 90 is examined. If the motion queue is empty, denoted by a 0 value for the motion queue pointer data 85 on FIG. 3, then control transfers to step 156. Otherwise, execution proceeds to step 150.

In step 150, the PAR buffer 112 is rearranged by copying each PAR within it to the previous PAR. Specifically, PAR0 114 is overwritten with PAR1 116, then PAR1 116 is overwritten with PAR2 118, then PAR2 118 is overwritten with PAR3 120, then PAR3 120 is overwritten with PAR4 122, then PAR4 122 is overwritten with PAR5 124. This rearrangement may be viewed as moving the PAR buffer one PAR forward in time. Execution then proceeds to step 152.

In step 152, the next available motion on the object motion queue 86 on FIG. 3 is removed from the object motion que, and overwritten in the PAR5 124 buffer. The object motion queue pointer 85 is changed to point to the next motion block on the object motion queue, or set to zero if there are no more motions on the queue. The used motion block is then deallocated, and execution proceeds to step 154.

In step 154, the counter ICOUNT 144 is incremented. Execution proceeds directly to step 146.

In step 156, the counter ICOUNT is examined and if equal to zero, the CheckPacket subroutine immediately returns. Otherwise, execution proceeds to step 158.

In step 158, the counter ICOUNT is again examined and if equal to one, execution transfers to step 160. Otherwise, execution transfers to step 162.

Figure 5:
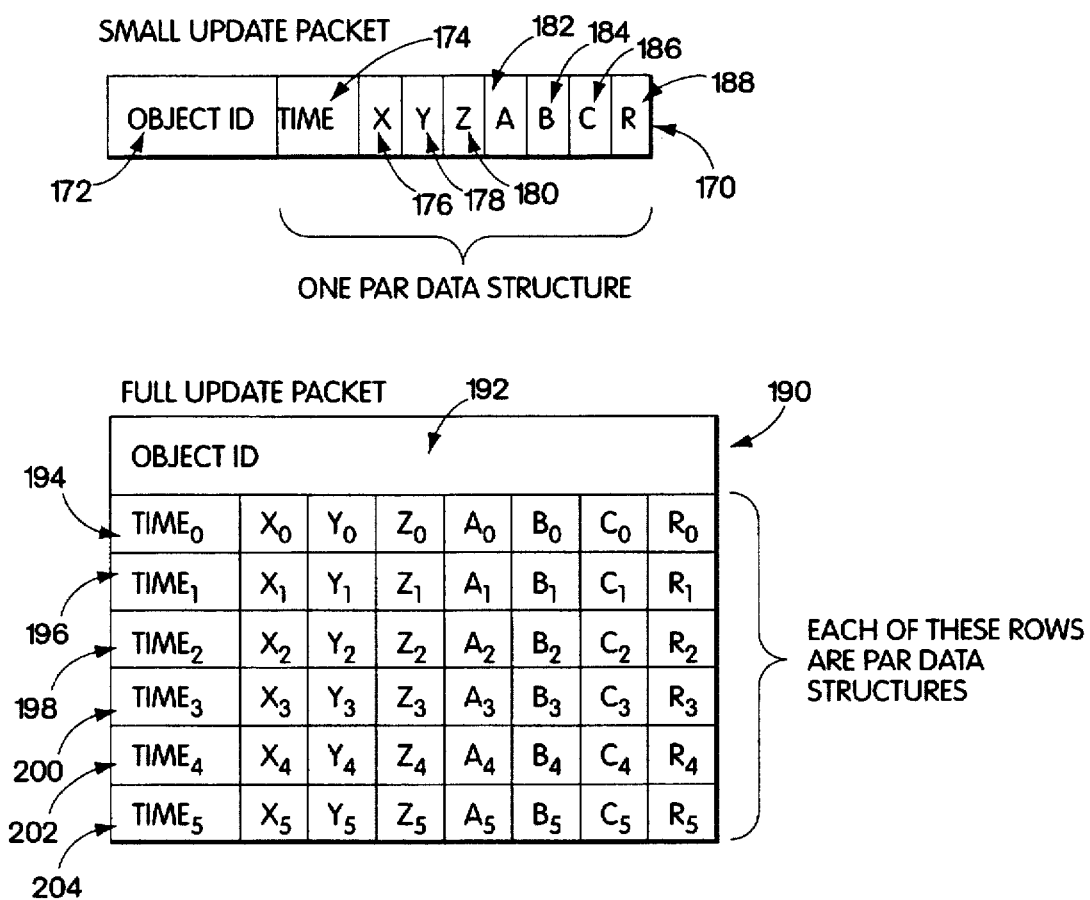
FIG. 5 is a data structure diagram showing examples of two different data packets being transmitted across the network.

In step 160, a small packet, described hereinunder in FIG. 5, is transmitted via the network 40 on FIG. 2 to the receiving computer. This small packet contains only the information identifying graphical object 90 uniquely, and the contents of PAR5 124, both of FIG. 3. After this, subroutine CheckPacket immediately returns.

In step 162, a large packet, described hereinunder in FIG. 5, is transmitted via the network 40 on FIG. 2 to the receiving computer. This large packet contains information that identifies graphical object 90 uniquely, plus the complete PAR buffer 112 on FIG. 3 of the graphical object. After this, subroutine CheckPacket immediately returns.

Referring now to FIG. 5, a small packet 170 is shown in detail, containing an identifier uniquely specifying a graphical object 172, a time 174, an X location 176, a Y location 178, a Z location 180, an A rotation axis component 182, a B axis rotation component 184, a C rotation axis component 186, and an axis rotation angle 188. This small packet would be used to transmit the contents of a graphical object's PAR5 124 on FIG. 3.

Also shown in detail is a large packet 190, also known as a full update packet, containing an identifier uniquely specifying a graphical object 192, and six PAR data structures, corresponding to PAR0 194, PAR1 196, PAR2 198, PAR3 200, PAR4 202, and PAR5 204. This large packet would be used to transmit the contents of the complete PAR buffer 126 on FIG. 3.

Figure 6:
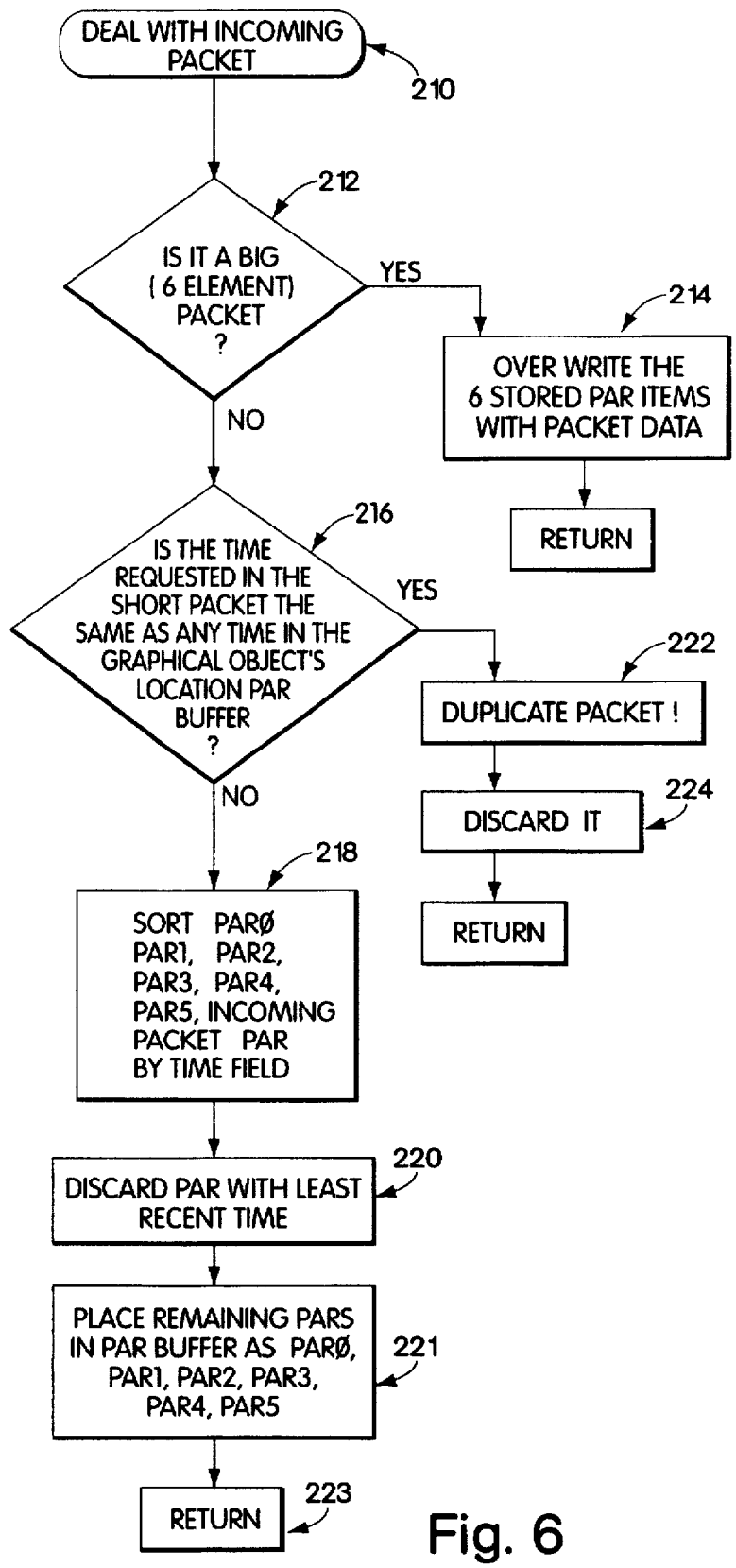
FIG. 6 is a flowchart showing sample software in the receiving station used whenever any packet is received.

Referring now to FIG. 6, the incoming packet interrupt routine is shown. The system packet interrupt routine running on computer 42 in FIG. 2 is given the address of routine DealWithIncomingPacket 210, to be called whenever either a short or long packet is received. When a packet is received, execution proceeds to step 212.

In step 212, the packet length is examined. If the packet is a long packet, of length equal to a full update packet, then execution transfers to step 214. Otherwise, execution continues with step 216.

In step 214, the graphical object identifier 192 is examined and the corresponding graphical object is located in the receiving computer database 44 on FIG. 2. This database contains graphical objects represented in the same way as in the transmitting computer 38. More specifically, the receiving computer contains a corresponding graphical object 90 of FIG. 3 containing a pointer to a location PAR buffer 112. The contents of the incoming packets corresponding to PAR0 194 are copied into the receiving computer's corresponding graphical object's PAR0 114, the incoming packet's PAR1 196 is copied into the receiving computer's corresponding PAR1 116, the incoming packet's PAR1 196 is copied into the receiving computer's corresponding PAR1 116, the incoming packet's PAR2 198 is copied into the receiving computer's corresponding PAR2 118, the incoming packet's PAR3 200 is copied into the receiving computer's corresponding PAR3 120, the incoming packet's PAR4 202 is copied into the receiving computer's corresponding PAR4 122, and the incoming packet's PAR5 204 is copied into the receiving computer's corresponding PAR5 124. The DealWithIncomingPacket subroutine then returns.

In step 216, the TIME data 174 of the incoming packet which is already known to be a small update packet is examined and compared with the TIME0 through TIME5 fields of the corresponding object's location PAR buffer. If the TIME data of the incoming packet is exactly equal to any of TIME0 through TIME5 in the location PAR buffer, execution transfers to step 222. Otherwise, execution continues with step 218.

In step 218, the receiving computer's corresponding graphical object's location PAR buffer is rearranged to accommodate the new PAR. Specifically, PAR0 through PAR5 as well as the incoming PAR are sorted according to their respective TIME fields.

In step 220, the least recent PAR is discarded. Execution continues with step 221.

In step 221, the remaining six PARs are placed back into the PAR buffer as PAR0 through PAR5. In this way, delayed packets are reinserted into the PAR buffer in their correct sequential position, and the oldest PAR is discarded. Execution continues with step 223, which returns execution to the caller.

Figure 7:
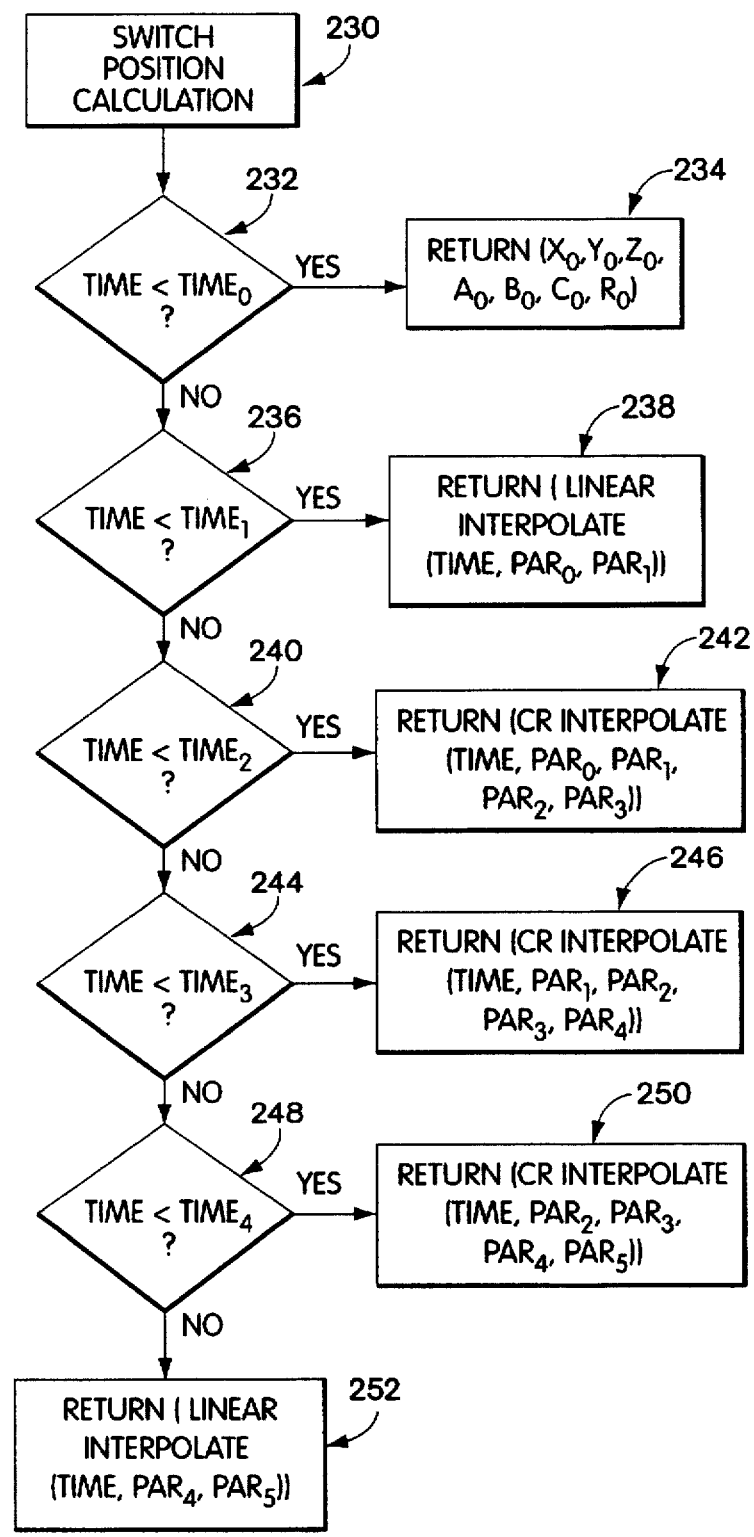
FIG. 7 is a flowchart showing sample software in the receiving station used whenever it is desired to a smoothly moved instantaneous position of a smoothly moved object.

Referring now to FIG. 7, the SwitchPositionCalculation subroutine supplies the switching function 46 of FIG. 2. Execution passes immediately to step 232.

In step 232, the current system time on the receiving computer is compared with TIME0 of PAR0 of the current object corresponding to PAR0 114 of FIG. 3. If the current system time is less than (meaning before) TIME0 of PAR0, then execution transfers to step 234, otherwise execution passes to step 236.

In step 234, the values of X0, Y0, Z0, A0, B0, C0, and R0 are fetched from PAR0 114 and returned as the current object position.

In step 236, the current system time is compared with TIME1 of PAR1 116. If the current system time is less than (meaning before) TIME1 of PAR1, then execution transfers to step 238, otherwise execution passes to step 240.

Figure 8:
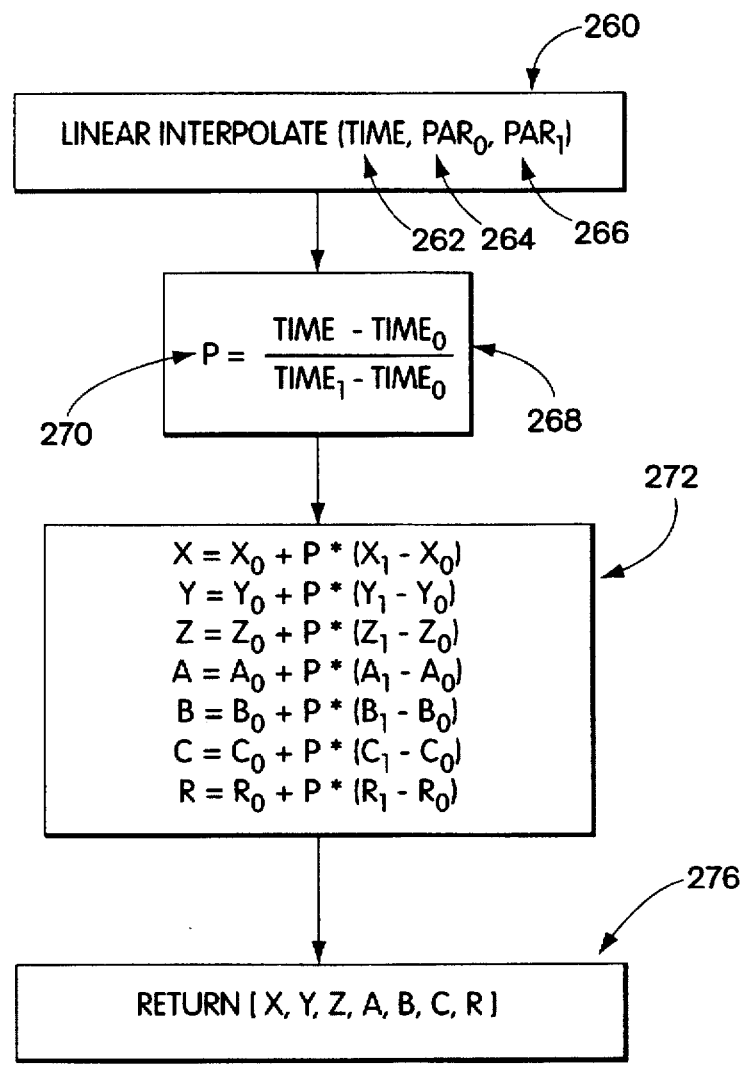
FIG. 8 is a flowchart showing a particular subroutine used in the receiving station whenever an object's desired future path is known with fewer than two future locations already determined.

In step 238, the subroutine LinearInterpolate, described hereinunder in FIG. 8, is called to perform a linear interpolation between PAR0 and PAR1, for a time equal to the current system time. The results of this linear interpolation, in the format of a PAR, are returned as the current object position.

In step 240, the current system time is compared with TIME2 of PAR2 118. If the current system time is less than (meaning before) TIME2 of PAR2, then the execution transfers to step 242, otherwise execution passes to step 244.

Figure 9:
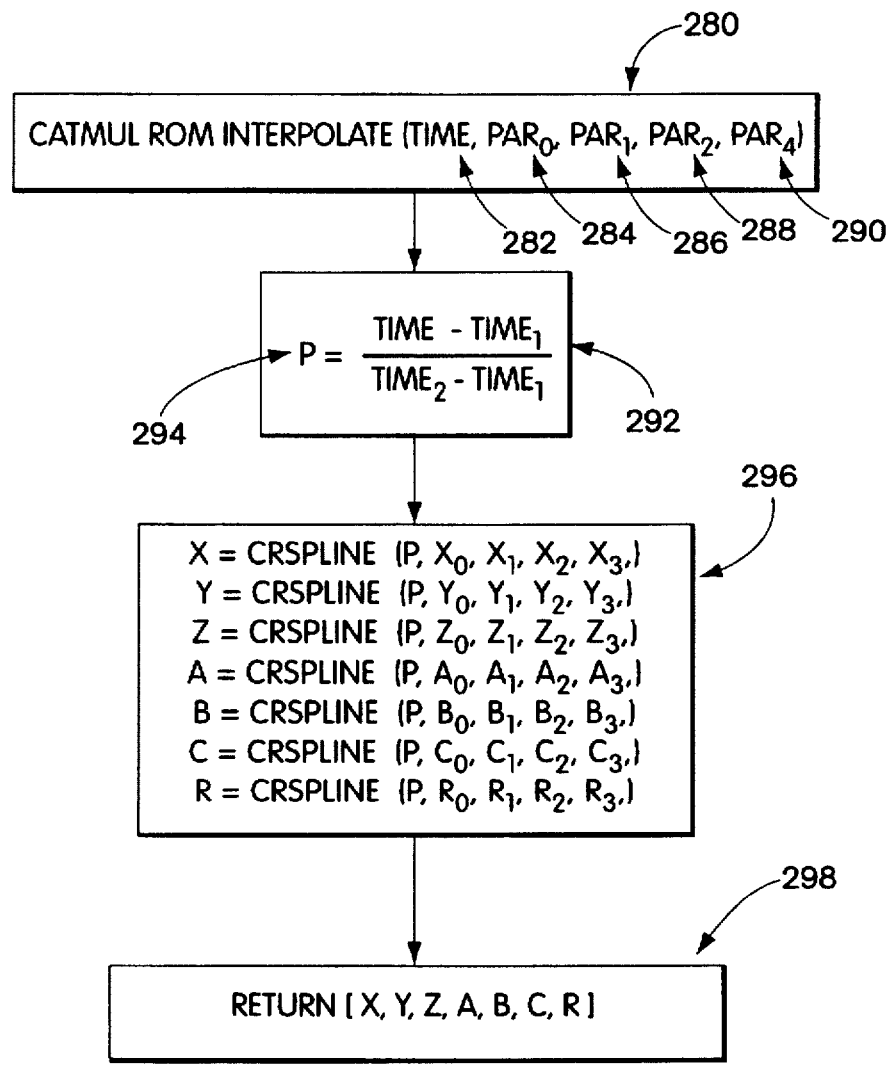
FIG. 9 is a flowchart showing a particular subroutine used in the receiving station whenever an object's desired future path is known and two or more points along that future path are already determined; and, FIG. 10 is a flowchart showing a particular subroutine used by the subroutine of FIG. 9.

In step 242, the subroutine CRInterpolate, described hereinunder in FIG. 9, is called to perform a Catmull-Rom spline interpolation among the four PARs PAR0, PAR1, PAR2, and PAR3, evaluated at a time equal to the current system time, and the resulting position, in the format of a PAR, is returned as the current object position.

In step 244, the current system time is compared with TIME3 of PAR3 118. If the current system time is less than (meaning before) TIME3 of PAR3, then the execution transfers to step 246, otherwise execution passes to step 248.

In step 246, the subroutine CRInterpolate is called to perform a Catmull-Rom spline interpolation among the four PARs PAR1, PAR2, PAR3, and PAR4, evaluated at a time equal to the current system time, and the resulting position, in the format of a PAR, is returned as the current object position.

In step 248, the current system time is compared with TIME4 of PAR4 118. If the current system time is less than (meaning before) TIME4 of PAR4, then the execution transfers to step 250, otherwise execution passes to step 252.

In step 250, the subroutine CRInterpolate is called to perform a Catmull-Rom spline interpolation among the four PARs PAR2, PAR3, PAR4, and PAR5, evaluated at a time equal to the current system time, and the resulting position, in the format of a PAR, is returned as the current object position.

In step 252, the subroutine LinearInterpolate is called to perform linear extrapolation between the points defined by PAR4 and PAR5, evaluated at a time equal to the current system time. More specifically, the formulation of LinearInterpolate gives interpolative results for times between TIME4 and TIME5, and extrapolative results for times after TIME5, but this is acceptable to the invention.

Referring now to FIG. 8, the subroutine LinearInterpolate is shown. The entry point of LinearInterpolate step 260 receives three arguments, the desired time for evaluation 262, the desired PAR1 264, and the desired PAR1 266. Execution passes immediately to step 268.

In step 268, parameterized time P 270 is calculated by subtracting the time TIME0 in PAR1 264 from the desired time 262, and dividing that by the difference between TIME1 in PAR1 266 and TIME0 in PAR0 264. More specifically, P 270 is zero when the desired time 262 is equal to TIME0, is equal to 1 when the desired time is equal to TIME1, varies smoothly from 0.0 to 1.0 as desired time 262 varies between TIME0 and TIME1, and becomes greater than 1.0 as the desired time 262 exceeds TIME1. Execution then passes to step 272.

In step 272, the components of the output PAR are calculated. X of the output PAR is calculated by adding X0 of the input PAR1 264 to the product of parameterized time P 270 times the difference between X1 of PAR1 266 and X0 of PAR1 264. Y of the output PAR is calculated by adding Y0 of the input PAR0 264 to the product of parameterized time P 270 times the difference between Y1 of PAR1 266 and Y0 of PAR0 264. Z of the output PAR is calculated by adding Z0 of the input PAR0 264 to the product of parameterized time P 270 times the difference between Z1 of PAR1 266 and Z0 of PAR0 264. A of the output PAR is calculated by adding A0 of the input PAR0 264 to the product of parameterized time P 270 times the difference between A1 of PAR1 266 and A0 of PAR0 264. B of the output PAR is calculated by adding B0 of the input PAR0 264 to the product of parameterized time P 270 times the difference between B1 of PAR1 266 and B0 of PAR0 264. C of the output PAR is calculated by adding C0 of the input PAR0 264 to the present of parameterized time P 270 times the difference between C1 of PAR1 266 and C0 of PAR0 264. R of the output PAR is calculated by adding R0 of the input PAR0 264 to the product of parameterized time P 270 times the difference between R1 of PAR1 266 and R0 of PAR0 264. Execution then proceeds to step 276.

In step 276, the X, Y, Z, A, B, C, and R values are placed in a PAR format and returned to the caller.

Referring now to FIG. 9, the flowchart for the subroutine CRInterpolate which performs interpolation by the Catmull-Rom method. In step 280, five arguments are received. These arguments are placed in the local variables TIME 282, PAR0 284, PAR1 286, PAR2 288, and PAR3 290. Execution proceeds to step 292.

In step 292, parameterized time P 294 is calculated by subtracting the time TIME1 in PAR1 288 from the desired time 282, and dividing that by the difference between TIME2 in PAR2 288 and TIME1 in PAR1 284. Execution proceeds to step 296.

Figure 10:
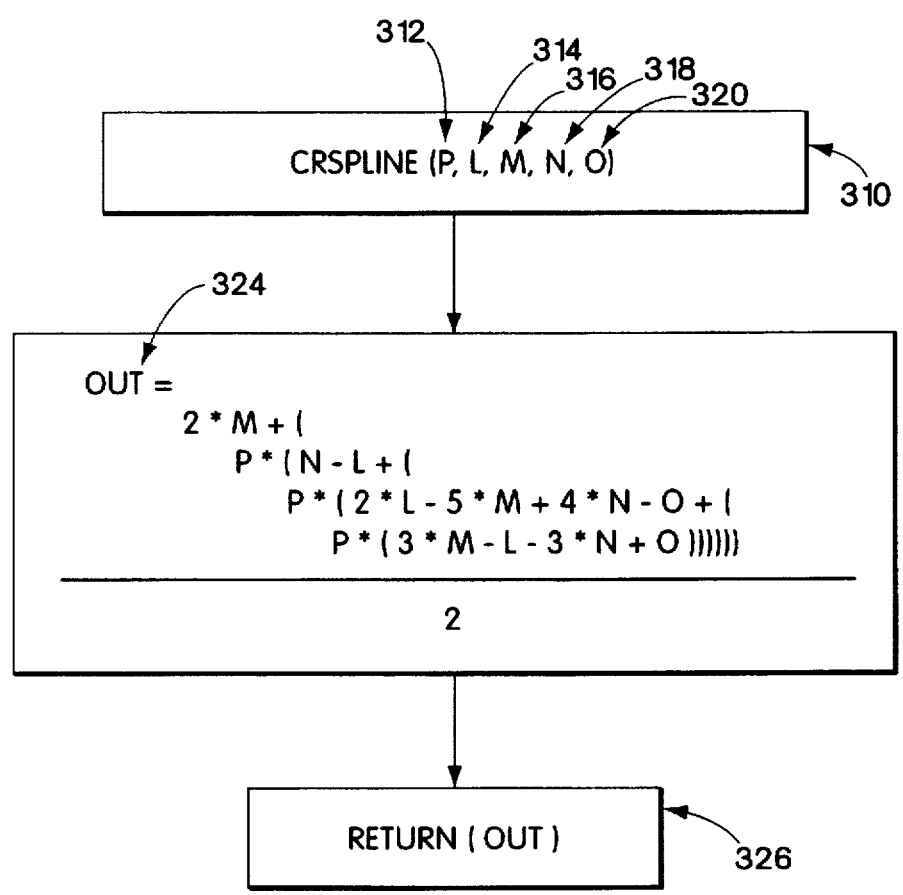

In step 296, the subroutine CRSpline, described hereinunder in FIG. 10, is called seven times, to calculate X, Y, Z, A, B, C, and R values for the components of the output PAR. These components are calculated in subroutine CRSpline, based on the values of parameterized time P 294, and the respective X, y, Z, A, B, C, and R values from the local subroutine arguments PAR0 284, PAR1 286, PAR2 288, and PAR3 290. Execution proceeds to step 298.

In step 298, the output X, Y, Z, A, B, C, and R are formatted into the PAR format and returned.

Referring now to FIG. 10, the operation of subroutine CRSpline is shown. Operation of CRSpline begins at step 310, where the five arguments corresponding to the local variables of parameterized time P 312, L 314, M 316, N 320, and O 322 are received. Execution proceeds to step 324.

In step 324, the output value OUT 324 is calculated by the Catmull-Rom formula. This formula can be found in *Computer Graphics: Principles and Practice*, by Foley, Van Dam, Feiner, and Hughes, ISBN 0-201-84840-6, Addison Wesley, 1995. Specifically, OUT 324 is set equal to:

$$(2M+(P*(N-L+(P*(2L-5M+4N-O+(P*(3M-L-3N+O))))))/2$$

Execution proceeds to step 326.

In step 326, the value of OUT 324 is returned to the calling routine.

The following is a program listing in ANSI C describing the indicated subroutines for implementation of the invention:

```
/*
**
**                SwitchPositionCalculation - where are we?
**
        Given six PAR vectors & time locations, and a time t,
        figure out where we should be. Note that this is "well defined"
        only for times between point 0 and point 5, and is merely a
        good guess for times outside those times. (that is, anywhere before
        point 0 or past point 5)
        There is mildly asymmetric behavior- for times less than T0, we
        use P0, and for times after T5, we extrapolate up to T5-T4 past
        T5.
        Veclength is how long the point vectors are- for a 4×4 this is
        16, for a PAR representation (recommended!) this is 7, etc.
        Legal return values:
        -2 - time is less than T0, so the object stays at T0 (no motion)
        -1 - time is between T0 and T1, linear interp between T0 and T1
         0 - time is between T1 and T2, CR-interpolate
         1 - time is between T2 and T3, all is well but we may overrun
             our buffer soon, please bump along to next C-R points.
         2 - time is between T3 and T4, all is still well but a transition
             to linear interpolation will occur at T4
         3 - time is greater than T4; the object is now in linear mode and
             will move along the ray from T4 through T5 and beyond ad
             infinitum.
         4 - time is greater than T5; the object is now in purely
             extrapolated mode. */
long spCatmullRomVecInterpolate (
                        float p0[ ], long t0 ,
                        float p1[ ], long t1 ,
                        float p2[ ], long t2 ,
                        float p3[ ], long t3 ,
                        float p4[ ], long t4 ,
                        float p5[ ], long t5,
                        TimeStamp now,
                        long veclength,
                        float out[ ] )
{
        float q;
        long i;
        long crs;
        crs = CRStatus (now, t0, t1, t2, t3, t4, t5);
                        /* unwrap phase of axis, angles */
        axisangleunwrap      (p0, p1);
        axisangleunwrap      (p1, p2);
        axisangleunwrap      (p2, p3);
        axisangleunwrap      (p3, p4);
```

```
        axisangleunwrap       (p4, p5);
switch (crs)
        {
            case (-2):
                for (i = 0; i < veclength; i++)
                    out [i] = p0[i];
                break;
            case (-1) :
                            /* linear interp */
                q = DeltaTtoQ (t4, t5, now);
                for (i = 0; i <= 15; i++)
                    out [i] = p4[i] + (p5[i] - p4[i]) * q ;
                break;
            case (0):
                q = DeltaTtoQ ( t1, t2, now);
                vecCRSpline (p0, p1, p2, p3, out, q);
                break;
            case (1):
                q = DeltaTtoQ (t2, t3, now);
                vecCRSpline (p1, p2, p3, p4, out, q);
                break;
            case (2):
                q = DeltaTtoQ (t3, t4, now);
                vecCRSpline (p2, p3, p4, p5, out, q);
                break;
            case (3):
            case (4):
                            /* linear interpolation */
                q = DeltaTtoQ (t4, t5, now);
                for (i = 0; i <= 15; i++)
                    out [i] = p4[i] + (p5[i] - p4[i]) * q ;
                break;
            };
            break;
        }
    return (crs);
}
/******************************************************************
**
**              unwrap axis and angle "flips" - to make interpolation by
**              linear or CR routines give smooth motion, it's important
**              to get rid of the discontinuities in PAR representations
**              that might occur when the PAR position information are
**              generated from sources such as 4×4 matrices. For example,
**              a rotation of +179 degrees is only two degrees away from a
**              rotation of -179 degrees IF we go counterclockwise, but
**              it's 358 degrees (almost a complete full rotation!) if we
**              go "the obvious" way.
**
**              By unwrapping these phase flips, (in effect, converting
**              the above -179 degrees to +181 degrees), we get a nice
**              smooth motion as desired.
**
**              There is a second kind of phase flip that occurs because there
**              are actually two rotation axes that will give the same rotation-
**              one can rotate around (A, B, C,) with rotation angle R, or
**              one can rotate around (-A, -B, -C) with rotation angle -R. Both
**              are exactly the same rotation, but with two different names.
**
**              We unwrap the second kind of flip first, because we want this
**              flip can alter both the rotation axis and angle, while the first
**              kind of unwrapping flip alters only the angle, not the axis (and
**              remember, we want smooth alteration in both the angle and axis.
**              If we left this second kind of phase flip in place, it is
**              possible that we'd end up with aCRSpline for A,B,C that is
**              very close to (or perhaps even passes through!) the origin and
**              THAT would cause divide-by-zero errors!
*/
static void axisangleunwrap (p0, p1)
{
    float d, df;
    float da;
                    /* determine distances to axis point for unflipped
                       second axis, and flipped second axis. If second
                       axis is closer, flip to it. */
        d = sqrt      (((p0[3]-p1[3] ) * (p0[3]-p1[3] )) +
                       ((p0[4]-p1[4] ) * (p0[4]-p1[4] )) +
                       ((p0[5]-p1[5] ) * (p0[5]-p1[5] )));
        df = sqrt     (((p0[3]+p1[3] ) * (p0[3]+p1[3] )) +
                       (p0[4]+p1[4] ) * (p0[4]+p1[4] )) +
```

```
                    ((p0[5]+p1[5]) ) * (p0[5]+p1[5] )));
                /* test - if needs flipping, flip axis to negative axis,
                    angle to negative angle */
        if (d > df)
            {
                p1[3] = - p1[3];
                p1[4] = -p1[4];
                p1[5] = -p1[5];
                p1[6] = -p1[6];
                if (*ang < 0) *ang += 6.28318;
            };
                /* part 2 - is the angle itself closer, or is the angle + or
                    - 360 degrees (actually radians) closer ? */
        da = p0[6]- p1[6];
        if ( da > 3.14159)
            {
                p1[6] = p1[6] - 6.28318;
            };
        if ( da < -3.14159)
            {
                p1[6] = p1[6] + 6.28318;
            };
        return;
}
/************************************************************************
**
**          a little helper function to calculate time to 0 <= q <= 1
**
**          (parameterized time computation)
**
*/
static float DeltaTtoQ ( long start, long stop, long inbetween)
{
        return ( ( (float) (inbetween - start)) / ((float) (stop - start )) );
}
/************************************************************************
            CRStatus - which branch do we take? Compare times!
*/
static long CRStatus (long t, long t0, long t1, long t2,
                    long t3, long t4, long t5)
{
        if (t < t0) return (-2);
        if (t < t1) return (-1);
        if (t < t2) return ( 0);
        if (t < t3) return ( 1);
        if (t < t4) return ( 2);
        if (t < t5) return ( 3);
        return (4) ;
}
/*************************************************************************/
/*
    The vectorized form of Catmull-Rom- given a vector of Catmull-Roms to
    evaluate, do them all in one swell foop.
    CAUTION - the following depends on C always passing arrays
    by reference- AND that
    you pass it the address of a vector. Passing it the address of
    a multi-dimensional array may or may not work depending on if
    your C compiler vectorizes arrays!!!
*/
void vecCRSpline (float p0[ ],
                    float p1[ ],
                    float p2[ ],
                    float p3[ ],
                    float out[ ],
                    float q, long howmany)
{
        long i;
        for (i = 0; i < howmany; i++)
            {
                out[i] = CRSpline (p0[i], p1[i], p2[i], p3[i], q);
            };
}
/************************************************************************
**
**          Catmull-Rom four-point spline calculation
**
------------------------------------------------------------------------
            Simplest function- evaluate a C-R spline at some parametric
            value of t (with 0.00 <= t <= 1.00 ), given four points that
            bracket the parameter space.
```

-continued

```
                The C-R basis matrix is this:
                        -1   3  -3   1
                         2  -5   4  -1
                        -1   0   1   0  / 2
                         0   2   0   0
                Multiply basis matrix cross the four points (poldest . . . Pnewest)T
                and then take that result and dot it with [ t^3   t^2   t^1   1 ]
                to get the value of the output of the parametric CRspline.
                GROT GROT GROT efficiency alert
                Now rather than doing all that matrix math, we can use some
                speedups. Of course, everything is a time-speed tradeoff,
                so for now we will just use the expanded form of the
                matrix math. If we need to later, we can trade off additional
                state information to hold intermediate values or even
                use forward differencing . . .
                See Foley and Van Dam secs 11.2 and on for more info.
*/
float CRSpline (float q, float p0, float p1, float p2, float p3)
{
        return(
                ( 2 * p1 +
                q * (p2 - p0 + (
                        q * ( 2*p0 - 5*p1 + 4*p2 - p3 + (
                            q * (3*p1 - p0 - 3*p2 + p3) ) ) ) ) / 2 ) ;
}
/************************************************************
**
**              The following routines are used to convert between the common
**              homogeneous 4x4 transform representation commonly used in
**              computer graphics, and the position, axis, and angle (PAR) rep.
**              used by these subroutines.
**
*/
static int Mat4x4ToAxisAngle(float *m, float *axis, float *angle)
{
        float q[4];
                        /* do this one by converting to quaternions first */
        Mat4x4ToQuaternion(m, q);
        QuaternionToAxisAngle (q, axis, angle);
        return(0);
}
static int Mat4x4ToQuaternion(float *m, float *q)
{
/*              The following code is adapted directly from the method given
                by Stanley Shepperd, Charles Stark Draper Labs, and
                published in the Journal of Guidance and Control, May/June
                1978, pgs 223 & 224 */
        float trace;
        long choice;
        float len;
        float magt, mag0, mag5, mag10;
/*              printf ("\nJGUIDCON: "); */
                        /* get trace of the matrix */
        trace = m[0] + m[5] + m[10];
                        /* Pick the largest of the quaternions to avoid negative-sqrt
                        situations - this is misrepresented in the Shepperd paper,
                        and the algorithm there presented (and restated in Graphics
                        Gems) divides by a near-zero number when this happens.
                        So, we instead do the following- what's important is not
                        the magnitude of the trace and the diagonal terms per
                        se, but rather the signed value of the divisors. So,
                        we switch on that basis instead. */
        magt = 1.0 + (2.0 * trace) - trace;
        mag0 = 1.0 + (2.0 * m[0] ) - trace;
        mag5 = 1.0 + (2.0 * m[5] ) - trace;
        mag10 = 1.0 + (2.0 * m[10] ) - trace;
        choice = -1;
        if (mag0 >= mag5 && mag0 >= mag10 && mag0 >= magt ) choice = 0;
        if (mag5 >= mag0 && mag5 >= mag10 && mag5 >= magt ) choice = 1;
        if (mag10 >= mag0 && mag10 >= mag5 && mag10 >= magt ) choice = 2;
        if (magt >= mag0 && magt >= mag5 && magt >= mag10) choice = 3;
                        /* extract 2*magnitudes (note this system is overdetermined) */
        switch (choice)
                {
                case (0):
                        q[0] = sqrt (1.0 + (2 * m[0] ) - trace );
                        q[1] = (m[1] + m[4]) / q[0];
                        q[2] = (m[2] + m[8]) / q[0];
                        q[3] = (m[6] - m[9]) / q[0];
                        break;
```

```
            case (1):
                q[1] = sqrt (1.0 + (2 * m[5]) - trace );
                q[0] = (m[1] + m[4]) / q[1];
                q[2] = (m[6] + m[9]) / q[1];
                q[3] = (m[8] - m[2]) / q[1];
                break;
            case (2):
                q[2] = sqrt (1.0 + (2 * m[10]) - trace );
                q[0] = (m[2] + m[8]) / q[2];
                q[1] = (m[6] + m[9]) / q[2];
                q[3] = (m[1] - m[4]) / q[2];
                break;
            case (3):
                q[3] = sqrt (1.0 + (2 * trace) - trace );
                q[0] = (m[6] - m[9]) / q[3];
                q[1] = (m[8] - m[2]) / q[3];
                q[2] = (m[1] - m[4]) / q[3];
                break;
            default:
                printf (" Fault in matrix->quaternion conversion- can't happen\n");
                q[3] = sqrt (1 + (2 * trace) - trace );
                q[0] = sqrt (1 + (2 * m[ 0]) - trace );
                q[1] = sqrt (1 + (2 * m[ 5]) - trace );
                q[2] = sqrt (1 + (2 * m[10]) - trace );
                /* we then assume q[3] (= real part) to be positive, and determine
                   signs for the other three parts */
                if ( m[6] - m[9] < 0.0) q[0] = - q[0];
                if ( m[8] - m[2]< 0.0) q[1] = - q[1];
                if ( m[1] - m[4]< 0.0) q[2] = - q[2];
                break;
        };
                /* and finally, divide all terms by two */
    q[0] = q[0] / 2;
    q[1] = q[1] / 2;
    q[2] = q[2] / 2;
    q[3] = q[3] / 2;
    if (q[3] < 0.0)
        {
            q[0] = - q[0];
            q[1] = - q[1];
            q[2] = - q[2];
            q[3] = - q[3];
        }
    return (0);
#endif
}
static int QuaternionToAxisAngle(float *q, float *axis, float *angle)
{
    float halfAng ;
    float sHalfAng;
    halfAng = acosf(q[3]);
    *angle = halfAng * 2.0;
    sHalfAng = sinf(halfAng);
    if (sHalfAng == 0.0)
        {
                /* angle = n*M_PI -> integer rotations = no rots. */
            axis[0] = 0.;
            axis[1] = 0.;
            axis[2] = 1.;
        }
    else {
            axis[0] = q[0]/sHalfAng;
            axis[1] = q[1]/sHalfAng;
            axis[2] = q[2]/sHalfAng;
        }
    return(0);
}
static int AxisAngleToMat4×4(float *axis, float angle, float *mat4×4)
{
        /*  2 transcendental functions, 15 multiplies, 10 adds */
                        /* Normalized axis. */
    float newaxis[3];
    float len;
    float c, s, t;
    float txy, tyz, txz;
    float tx2, ty2, tz2;
    float sx, sy, sz;
    len = sqrtf(axis[0]*axis[0]+axis[1]*axis[1]+axis[2]*axis[2]);
    newaxis[0] = axis[0]/len;
    newaxis[1] = axis[1]/len;
```

-continued

```
    newaxis[2] = axis[2]/len;
    c = cosf(angle);
    s = sinf(angle);
    t = 1 - c;
    tx2 = t * newaxis[0] * newaxis[0];
    ty2 = t * newaxis[1] * newaxis[1];
    tz2 = t * newaxis[2] * newaxis[2];
    txy = t * newaxis[0] * newaxis[1];
    tyz = t * newaxis[1] * newaxis[2];
    txz = t * newaxis[0] * newaxis[2];
    sx = s * newaxis[0];
    sy = s * newaxis[1];
    sz = s * newaxis[2];
    mat4x4[0] = tx2 + c;
    mat4x4[1] = txy + sz;
    mat4x4[2] = txz - sy;
    mat4x4[4] = txy - sz;
    mat4x4[5] = ty2 + c;
    mat4x4[6] = tyz + sx;
    mat4x4[8] = txz + sy;
    mat4x4[9] = tyz - sx;
    mat4x4[10] = tz2 + c;
    return(0);
}
```

Having above indicated several embodiments of the Subject Invention, it will occur to those skilled in the art that modifications and alternatives can be practiced within the spirit of the invention. It is accordingly intended to define the scope of the invention only as indicated in the following claims.

We claim:

1. A system for assuring the smooth motion of a graphical object presented on-screen at a display at a recipient node on a network in which data is transmitted from a source node on said network to said recipient node, comprising:

means at said source node for transmitting data corresponding to the intended motion of said graphical object at said recipient node including an indication of the predictability of the motion of said graphical object; and, means at said recipient node for receiving said data and said indication, and for smoothing said data in accordance with said indication.

2. The system of claim 1 wherein said indication includes means for dividing the predictability of said data into a number of categories dependent upon the number of future points specifiable, and means at said recipient node for applying different smoothing algorithms to said data based upon the category of said data.

3. The system of claim 2, wherein for a category in which there is no predictability said smoothing algorithm includes a linear extrapolation algorithm.

4. The system of claim 2, wherein for a category in which there is maximum predictability said smoothing algorithm includes the Catmull-Rom spline algorithm.

5. The system of claim 2, wherein for a category in which there is an intermediate amount of predictability said smoothing algorithm includes a linear interpolation algorithm.

6. The system of claim 1, and further including means for angle and phase unwrapping of the rotation of said graphical object so as to eliminate boundary effects when rotating said graphical object in excess of 360 degrees.

7. The system of claim 6, wherein said means for angle and phase unwrapping includes means for ascertaining a rotation of 360 degrees plus the desired rotation, means for ascertaining a desired rotation, means for ascertaining a rotation of the desired rotation minus 360 degrees, means for selecting which of said last-mentioned quantities is closest to the previous achieved rotation for the rotation of said graphical object.

8. The system of claim 1, and further including means for reducing the bandwidth of said data by transmitting only a portion of said data dependent upon the number of intended motions of said graphical object to be transmitted.

9. The system of claim 8, wherein said data is transmitted as packets of data and wherein said bandwidth reducing means includes means for transmitting a reduced-length packet when the number of motions of said graphical object to be transmitted is below a predetermined threshold.

10. The system of claim 1, wherein said data transmitting means includes means for specifying predictability based on the number of predictable future locations for said graphical object.

11. The system of claim 1, wherein said data transmitting means includes means for specifying the predictability based the type of graphical object being depicted.

12. The system of claim 1, wherein said data transmitting means includes means for transmitting data specific for a predetermined application, said predetermined application including means for designating the predictability of motion of said graphical object, and wherein said smoothing means includes means for selecting a smoothing algorithm based on said designated predictability.

13. The system of claim 1, wherein said data is transmitted in packetized form and wherein said smoothing means includes means for recognizing redundant packets and for discarding selected ones of said redundant packets.

14. The system of claim 1, wherein said data is transmitted in packetized form, each of said packets containing redundant data, said smoothing means including means for utilizing said redundant data to generate uninterrupted motion of said graphical object in the presence of lost packets.

15. The system of claim 1, wherein said source node includes means for timestamping said data, said recipient node including means to sort said data based on said timestamps, said recipient node including means to discard old data based on said timestamps, said recipient node including means to place said data into correct time order based on said timestamps.

\* \* \* \* \*